US011654494B2

(12) United States Patent
Oka et al.

(10) Patent No.: US 11,654,494 B2
(45) Date of Patent: May 23, 2023

(54) MACHINING TOOL

(71) Applicant: HONDA MOTOR CO., LTD., Tokyo (JP)

(72) Inventors: Hideki Oka, Tochigi-ken (JP); Tadatomo Hatayama, Tochigi-ken (JP); Masaya Koide, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 119 days.

(21) Appl. No.: 17/260,581

(22) PCT Filed: Jul. 19, 2019

(86) PCT No.: PCT/JP2019/028504
§ 371 (c)(1),
(2) Date: Jan. 15, 2021

(87) PCT Pub. No.: WO2020/017644
PCT Pub. Date: Jan. 23, 2020

(65) Prior Publication Data
US 2021/0276105 A1    Sep. 9, 2021

(30) Foreign Application Priority Data

Jul. 20, 2018 (JP) .............................. JP2018-136407
Oct. 29, 2018 (JP) .............................. JP2018-202495

(51) Int. Cl.
*B23B 51/10* (2006.01)
*B23D 77/14* (2006.01)
*B23D 75/00* (2006.01)

(52) U.S. Cl.
CPC ............. *B23B 51/10* (2013.01); *B23D 75/00* (2013.01); *B23D 77/14* (2013.01);
(Continued)

(58) Field of Classification Search
CPC ........ B23B 51/10; B23D 75/00; B23D 77/14; B23D 2277/081; B23D 2277/085;
(Continued)

(56) References Cited

U.S. PATENT DOCUMENTS 3,945,752 A * 3/1976 Bennett ................ B23Q 1/0036
82/158
4,066,380 A * 1/1978 Beck ........................ B23G 3/08
408/125

(Continued)

FOREIGN PATENT DOCUMENTS

CN    101378869    3/2009
CN    105517740    4/2016
(Continued)

OTHER PUBLICATIONS

International Search Report and Written Opinion for International Application No. PCT/JP2019/028504 dated Aug. 27, 2019, 10 pages.
(Continued)

*Primary Examiner* — Eric A. Gates
(74) *Attorney, Agent, or Firm* — Amin, Turocy & Watson, LLP (57) ABSTRACT

A machining tool forms a first relief surface, a valve seat surface, and a second relief surface by cutting the inner periphery of a valve seat blank having an opening. The machining tool is provided with: a tool body rotationally driven about an axis; a plurality of cutting tools rotating with the tool body; a cartridge mounted to the tool body so as to be capable of moving forward and backward along the axis; and a cam in contact with the base end surface of the cartridge and moving the cartridge forward and backward. At least one of the plurality of cutting tools is mounted to the cartridge.

13 Claims, 8 Drawing Sheets

(52) U.S. Cl.
CPC .. *B23D 2277/081* (2013.01); *B23D 2277/085* (2013.01); *B23D 2277/60* (2013.01); *Y10T 408/375* (2015.01); *Y10T 408/859* (2015.01)

(58) Field of Classification Search
CPC ........... B23D 2277/60; Y10T 407/2254; Y10T 408/83; Y10T 408/859; Y10T 408/86; Y10T 408/375
See application file for complete search history.

(56) References Cited

U.S. PATENT DOCUMENTS

| | | | | |
|---|---|---|---|---|
| 4,690,595 | A | * | 9/1987 | Heule .................. B23B 51/105 408/173 |
| 5,288,184 | A | * | 2/1994 | Heule .................... B23B 51/10 408/189 |
| 7,699,567 | B2 | | 4/2010 | Nedzlek |
| 2009/0080984 | A1 | | 3/2009 | Lehmann et al. |
| 2015/0115549 | A1 | * | 4/2015 | Teusch .................. B23B 51/10 279/142 |
| 2016/0214183 | A1 | | 7/2016 | Kanaboshi et al. |

FOREIGN PATENT DOCUMENTS

| | | | |
|---|---|---|---|
| CN | 106536104 | 3/2017 | |
| DE | 102008004516 B4 * | 2/2015 | ......... B23B 51/0045 |
| JP | 3020179 | 3/2000 | |
| JP | 2003-340618 | 12/2003 | |
| JP | 2009-525194 | 7/2009 | |
| JP | 2010-532277 | 10/2010 | |
| JP | 2011-125962 | 6/2011 | |
| WO | 2009/005804 | 1/2009 | |

OTHER PUBLICATIONS

Indian Office Action for Indian Patent Application No. 202147006577 dated Oct. 1, 2021.
Japanese Office Action for Japanese Patent Application No. 2020-531391 dated Nov. 1, 2022.
Chinese Office Action for Chinese Patent Application No. 201980048672.0 dated Mar. 6, 2023.

\* cited by examiner

MACHINING TOOL

TECHNICAL FIELD

The present invention relates to a machining tool for performing cutting operation on the inner periphery of an opening of a workpiece to thereby form a plurality of machined surfaces.

BACKGROUND ART

For example, Japanese Patent No. 3020179 discloses a machining tool for performing cutting operation on the inner periphery of an opening to form a plurality of machined surfaces having different angles of inclination with respect to the axial direction. This machining tool is provided with a plurality of cutting tools attached to a distal part of its body that is driven to rotate around the axis line. The cutting tools are simultaneously placed in contact with the machined portion of the workpiece and rotated together with the tool body to thereby form a plurality of machined surfaces at the same time.

SUMMARY OF INVENTION

In the cutting operation above, the plurality of cutting tools of the machining tool are placed in contact with the machined portion simultaneously, and the plurality of machined surfaces have different machining allowances. Accordingly, a cutting tool used to form a machined surface having a larger machining allowance is likely to be worn more than the other cutting tools. Especially, if a cutting tool used to process a machined surface requiring higher accuracy than other machined surfaces is susceptible to wear, then it is necessary to frequently sharpen and replace this cutting tool so as to form the machined surface with required accuracy. It is therefore difficult to achieve both of high accuracy and efficient machining. Furthermore, simultaneously placing the plurality of cutting tools in contact with the machined portion requires adjusting the relative positions of the multiple cutting tools highly precisely, which complicates the work of reattaching the cutting tools after sharpening or replacement. This will also hinder efficient machining operation.

The present invention has been devised in order to solve such problems, and an object of the invention is to provide a machining tool capable of easily performing highly accurate and efficient cutting operation.

An aspect of the present invention resides in a machining tool for performing cutting operation on an inner periphery of a workpiece including an opening to form a plurality of machined surfaces. The machining tool includes: a tool body configured to be driven to rotate around an axis line; a plurality of cutting tools configured to rotate together with the tool body; a cartridge configured to be attached to the tool body so as to advance and retreat along the axis line; and a cam configured to come into contact with a proximal end surface of the cartridge, to thereby cause the cartridge to advance and retreat. At least one of the plurality of cutting tools is attached to the cartridge.

According to the present invention, the cutting tool attached to the cartridge can be moved forward and backward along the axis line. This enables the cutting tool attached to the cartridge to come in contact with a machined portion with different timing from the cutting tools that are directly attached to the tool body, whereby a plurality of machined surfaces can be machined with different timings. Consequently, for example, a machined surface (objective machined surface) that requires being formed more accurately than the other machined surfaces can be machined after the other machined surfaces have been machined. It is then possible to reduce the machining allowance for the machining of the objective machined surface, and so it is possible to effectively reduce the wear of the cutting tool used to machine the objective machined surface. As a result, the objective machined surface can be machined highly accurately without the need to increase the frequencies of sharpening and replacement of the cutting tool.

Furthermore, the cutting operations for the plurality of machined surfaces with different timings thus require simply moving the cartridge forward and backward, without the need for tool replacement using a tool changer or the like, which also enables efficient cutting operations.

Thus, the machining tool of the present invention makes it possible to easily perform highly accurate and efficient cutting operations.

Moreover, with the machining tool, the cartridge can move forward and backward along the axis line, and therefore the external dimension in the direction orthogonal to the axis line can be reduced, as compared to configurations where the cartridge is moved forward and backward in a direction inclined with respect to the axis line, for example. Accordingly, for example, it is easy to configure a multi-axis arrangement in which multiple machining tools are arranged side by side, in order to perform cutting operations on the inner peripheries of a plurality of openings at one time.

DESCRIPTION OF EMBODIMENTS

The machining tool according to the invention will be described in detail in connection with preferred embodiments while referring to the accompanying drawings. In the drawings, constituent components having the same or similar functions and effects will be labeled using the same reference numerals and may not be described repeatedly.

The description below will illustrate an example in which a machining tool 10 of an embodiment shown in FIGS. 1, 2, 3, 4A, 4B and 4C is applied to machine the inner periphery of an opening 12a of a valve seat material 12 shown in FIG. 5 serving as a workpiece, so as to form, as a plurality of machined surfaces, a first relief surface 14, a valve seat surface 16, and a second relief surface 18 shown in FIG. 6. The first relief surface 14, the valve seat surface 16, and the second relief surface 18 are inclined surfaces having different angles of inclination with respect to the axial direction of the opening 12a. As shown in FIG. 5, the valve seat material 12 is press-fitted into or joined to a cylinder head body 20, and machined as explained above to form a valve seat 24 of a cylinder head 22 shown in FIG. 6.

However, note that the object of machining with the machining tool 10 is not limited to valve seat material 12. Further, the plurality of machined surfaces that can be formed by the machining tool 10 are not limited to first relief surface 14, valve seat surface 16, and second relief surface 18. The machining tool 10 can be applied in a desirable manner to implementations where the inner periphery of an opening of the workpiece is machined to form a plurality of machined surfaces. Examples include implementations where the opening's inner periphery of the workpiece is processed to form rough bored and fine bored surfaces and implementations where the opening's inner peripheral surface is processed to form bored and chamfered surfaces, for example.

First, referring to FIG. 6, the cylinder head 22 will be described briefly. The cylinder head 22 includes the ring-shaped valve seat 24 that is made of a sintered body of an iron-based material such as steel material, for example, and the cylinder head body 20 that is made of an aluminum-based material such as pure aluminum or aluminum alloy, for example. The valve seat 24 may further contain high electric conductivity material such as copper-based material etc.

The cylinder head body 20 has a port 26 whose one end opens into a combustion chamber (not shown). In this embodiment, the ring-shaped valve seat 24 is inserted into the edge of the opening at one end of the port 26 (on the arrow X1 side) and fitted on the edge of the opening.

The inner periphery of the valve seat 24 includes the first relief surface 14, the valve seat surface 16, and the second relief surface 18 having different surface directions, and the first relief surface 14, the valve seat surface 16, and the second relief surface 18 are arranged in this order from the one end of the axial direction (the arrow X1 side) toward the other end thereof (the arrow X2 side). The first relief surface 14, the valve seat surface 16, and the second relief surface 18 are inclined in such a direction as to enlarge the diameter of the opening toward the combustion chamber side (in the arrow X1 direction). For example, the angle of inclination of the first relief surface 14 along the axial direction of the valve seat 24 can be 60°, the angle of inclination of the valve seat surface 16 can be 45°, and the angle of inclination of the second relief surface 18 can be 30°, but they are not limited to this example.

A valve not shown rests on, or separates away from, the valve seat surface 16 in the inner peripheral surface of the valve seat 24, to thereby open and close the port 26. Accordingly, in order to make the valve and the valve seat surface 16 come in contact with each other without clearance so as to improve the quality of the cylinder head 22, it is necessary to highly accurately machine especially the valve seat surface 16 in the inner peripheral surface of the valve seat 24 so that it offers highly accurate circularity, surface roughness, etc.

Next, referring to FIG. 5, the valve seat material 12 before being machined to be the valve seat 24 will be described, where the first relief surface 14, the valve seat surface 16, and the second relief surface 18 are not formed yet. The valve seat material 12 is a ring-shaped body that is press-fitted into the cylinder head body 20. The inner periphery of the valve seat material 12 includes an orthogonal end surface 28 disposed at one end of the axial direction (on the arrow X1 side), an axial-direction surface 30 disposed at the other end of the axial direction, and a tapered surface 32 disposed between the orthogonal end surface 28 and the axial-direction surface 30, for example. The orthogonal end surface 28 lies orthogonal to the axial direction. The axial-direction surface 30 is formed flush with the inner peripheral surface of the port 26. The tapered surface 32 is tapered so that it inclines in such a direction as to enlarge the opening toward the one end of the axial direction (in the arrow X1 direction).

Next, referring to FIGS. 1 to 4C, the machining tool 10 will be described. The machining tool 10 is used to perform cutting operations on the inner periphery of the opening 12a of the valve seat material 12 shown in FIG. 5, to thereby form the first relief surface 14, the valve seat surface 16, and the second relief surface 18 shown in FIG. 6. In this embodiment, the machining tool 10 is a composite machining tool that can also perform a reaming operation on a valve guide hole (not shown), as well as cutting operations on the valve seat material 12. The valve guide hole is formed in the cylinder head body 20, into which the shaft of the aforementioned valve (not shown) can be inserted.

Figure 1:
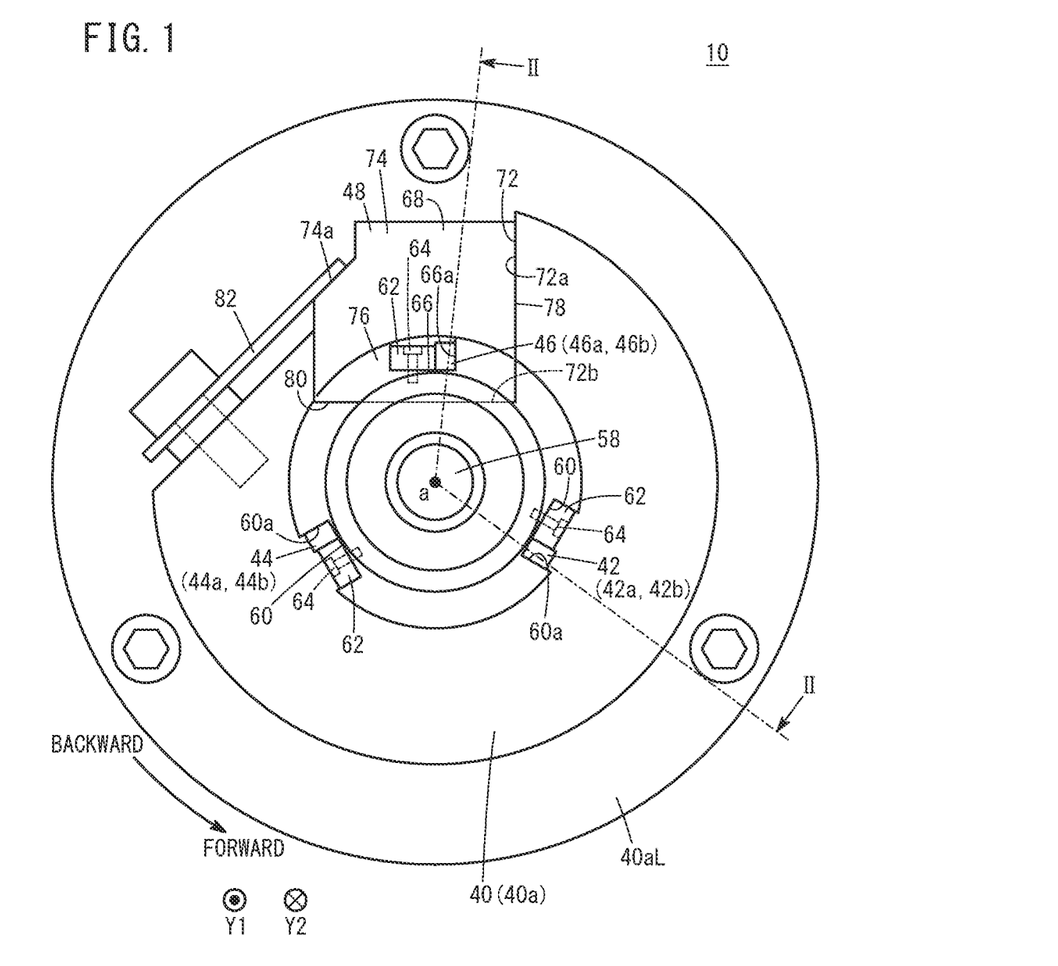
FIG. 1 is a schematic explanatory diagram illustrating the distal end surface of a machining tool according to an embodiment of the invention.
Figure 2:
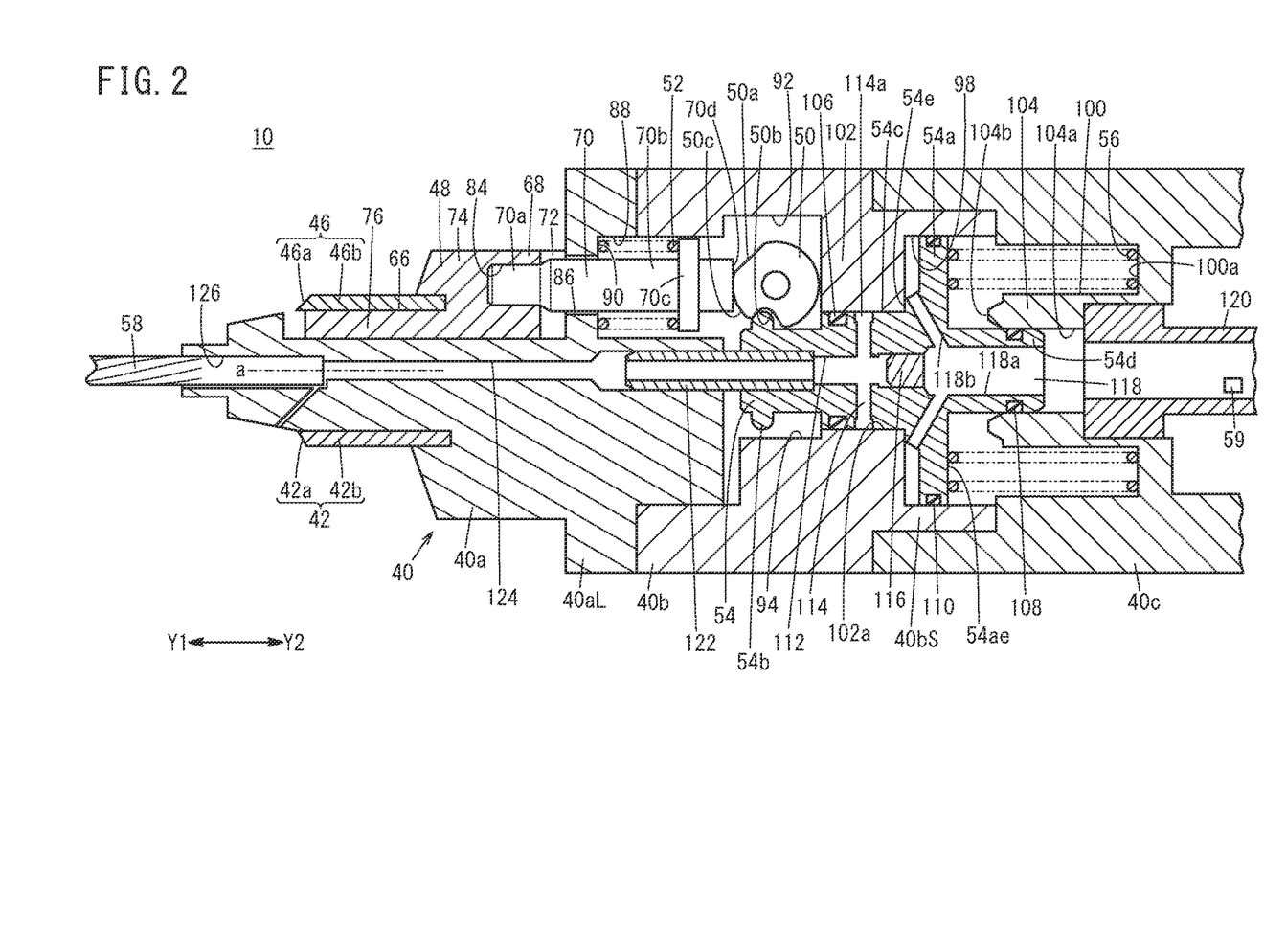
FIG. 2 is a cross sectional view of main parts taken along line II-II in FIG. 1, where a rod is in an advanced position.
Figure 3:
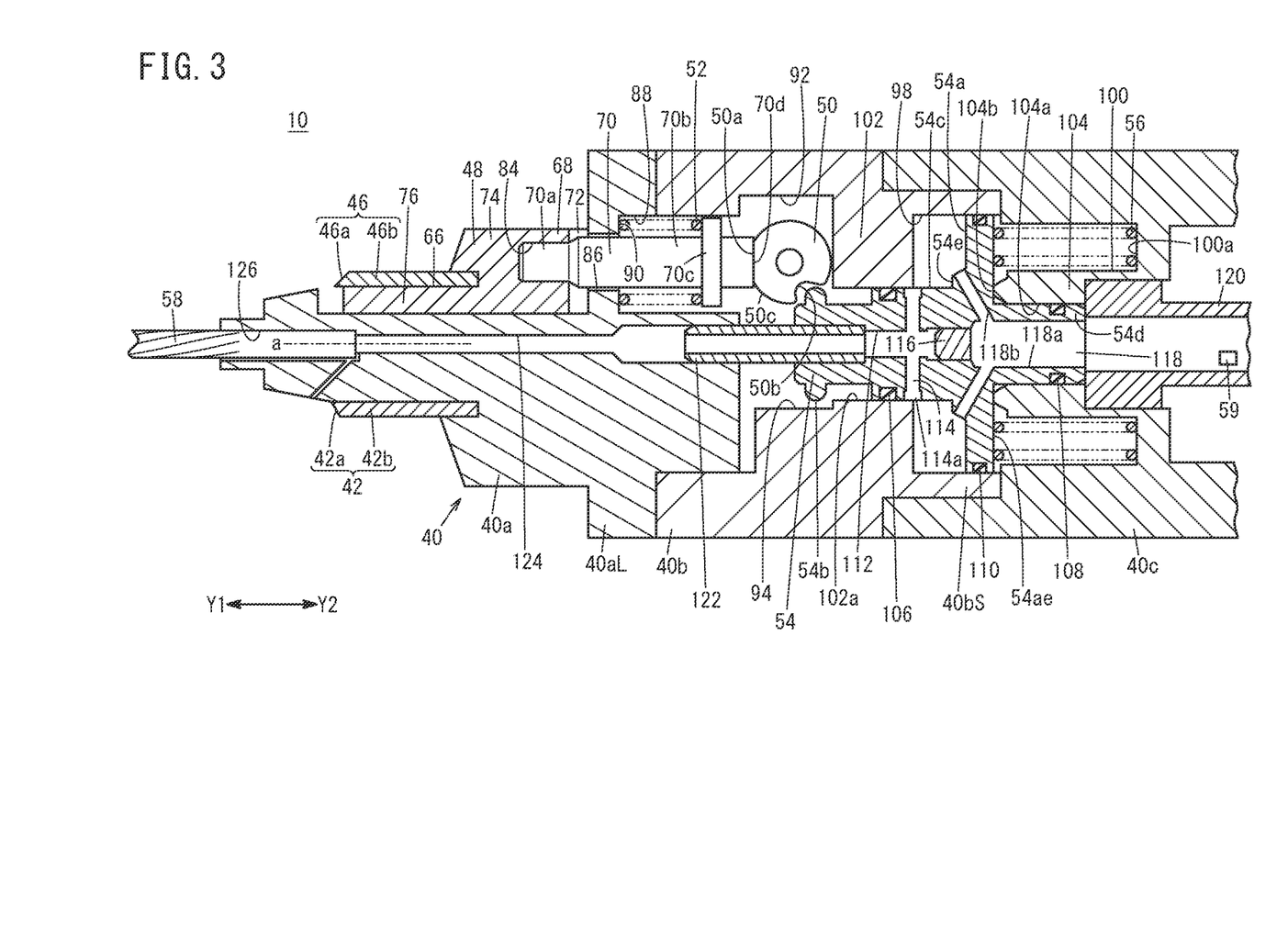
FIG. 3 is a cross sectional view of the main parts, where the rod of FIG. 2 is in a retreated position.

Specifically, the machining tool 10 chiefly includes a tool body 40, a first cutting tool 42, a second cutting tool 44 (see FIG. 1), a third cutting tool 46, a cartridge 48, a cam 50 (see FIGS. 2 to 4C), a cam urging member 52, a rod 54, a piston urging member 56, a reamer 58, and a fluid sensor 59 (see FIGS. 2 and 3).

As shown in FIGS. 2 and 3, the tool body 40 is assembled by integrating a first member 40a, a second member 40b, and a third member 40c together. The first member 40a, the second member 40b, and the third member 40c are joined together in this order from the distal end of the tool body 40 (the arrow Y1 side) to the proximal end thereof (the arrow Y2 side). The first member 40a is formed into a substantially cylindrical shape that is stepped so that the diameter of its distal end is smaller than the diameter of its proximal end. The first member 40a further has a large-diameter portion 40aL on its proximal part. The proximal end of the first member 40a and the distal end of the second member 40b are fixed together by bolting or the like through the outer periphery of the large-diameter portion 40aL.

The proximal end part of the second member 40b has a small-diameter portion 40bS having a smaller diameter than its distal part. The distal end of the third member 40c is fitted on the small-diameter portion 40bS to fix together the proximal end of the second member 40b and the distal end of the third member 40c. The proximal end of the third member 40c is fixed to a rotary spindle of a rotational driving mechanism of a machine tool (not shown) so that the tool body 40 can be driven to rotate around the axis line a. Furthermore, the tool body 40 is driven to move forward and backward along the axis line a by a tool body driving mechanism of the machine tool.

The first cutting tool 42 has a cutting edge 42a for forming the first relief surface 14 (see FIG. 6), and is attached to the first member 40a of the tool body 40 through a shank 42b in a detachable manner. Specifically, as shown in FIG. 1, the first cutting tool 42 is directly fixed to the tool body 40 by holding the shank 42b between an inner wall 60a of a receptacle groove 60 formed in the first member 40a along the axis line a and a fastening member 62 that is disposed forward of the inner wall 60a of the receptacle groove 60 in the direction in which the tool body 40 rotates (hereinafter simply referred to also as a rotation direction).

The fastening member 62 includes a threaded hole formed along the radial direction of the tool body 40, and a screw 64 is screwed into the threaded hole to apply a fastening force to the shank 42b by pressing the shank 42b against the inner wall 60a of the receptacle groove 60 from forward in the rotation direction. The fastening member 62 is capable of loosening the fastening force onto the shank 42b by loosening the engagement between the threaded hole and the screw 64, whereby the shank 42b can be put into and taken out from the gap between the inner wall 60a of the receptacle groove 60 and the fastening member 62.

The second cutting tool 44 has a cutting edge 44a (see FIG. 7) for forming the second relief surface 18 (see FIG. 6), and is attached to the first member 40a of the tool body 40 through a shank 44b in a detachable manner. Like the first cutting tool 42, the second cutting tool 44 is also directly fixed to the tool body 40 through a fastening member 62.

The third cutting tool 46 has a cutting edge 46a for forming the valve seat surface 16 (see FIG. 6), and is attached to the cartridge 48 through a shank 46b in a detachable manner. Specifically, the third cutting tool 46 is fixed to the cartridge 48 by holding the shank 46b between an inner wall 66a of a receptacle groove 66 formed in the cartridge 48 along the axial line a and a fastening member 62 provided forward of the inner wall 66a in the rotation direction.

The cartridge 48 is attached to the first member 40a of the tool body 40 in such a manner that the cartridge 48 can move forward and backward along the axis line a, and the cartridge 48 is driven to rotate together with the tool body 40. In the description below, the direction toward the distal end of the tool body 40 (the arrow Y1 direction) is defined as a forward or advancing direction and the direction toward the proximal end of the tool body 40 (the arrow Y2 direction) is defined as a backward or retreating direction.

As shown in FIGS. 2 and 3, the cartridge 48 includes a cartridge body 68 and a pushrod 70 that are integrated together. The cartridge body 68 is slidably disposed in a groove 72 formed in the first member 40a of the tool body 40 along the axis line a. The cartridge body 68 includes a body 74 and an extending portion 76 that extends from a portion of the body 74 lying closer to the axis line a (a portion of the body 74 that resides closer to the center of the radial direction of the tool body 40) toward the distal end (in the arrow Y1 direction). A receptacle groove 66 for accommodating the shank 46b of the third cutting tool 46 is formed in the entire length of the extending portion 76 in the axial direction and part of the distal end portion of the body 74.

As shown in FIG. 1, the body 74 is substantially rectangular as viewed from the distal side of the axis line a, but it has a pressed surface 74a formed by vertically cutting off a corner part of the rectangular shape that is positioned forward in the rotation direction and outward in the radial direction of the tool body 40. The body 74 and the extending portion 76 jointly have a flush end surface 78 on the back side in the rotation direction, and also jointly have a flush end surface 80 on the side closer to the axis line a. These end surfaces 78 and 80 are orthogonal to each other. The pressed surface 74a is inclined with respect to both of the end surfaces 78 and 80. In this case, it is preferred that the pressed surface 74a is inclined at about 45° with respect to the end surfaces 78 and 80, for example.

The groove 72 has a first inner wall surface 72a being in contact with the end surface 78 of the cartridge body 68, and a second inner wall surface 72b being in contact with the end surface 80. The first inner wall surface 72a extends along the end surface 78, and the second inner wall surface 72b extends along the end surface 80. The first inner wall surface 72a and the second inner wall surface 72b are hence orthogonal to each other.

A flat spring or plate spring 82 (pressing member) attached to the first member 40a of the tool body 40 by bolting or the like resides in contact with the pressed surface 74a from forward in the rotation direction. The flat spring 82 presses the cartridge body 68 from forward in the rotation direction of the cartridge body 68, along a direction that is inclined with respect to both of the first inner wall surface 72a and the second inner wall surface 72b of the groove 72.

As shown in FIGS. 2 and 3, the proximal end of the body 74 has a fitting hole 84 formed along the axis line a, and a small-diameter portion 70a at the distal end of the pushrod 70 is fitted into the fitting hole 84. The pushrod 70 further includes a shaft 70b having a larger diameter than the small-diameter portion 70a and connected to the proximal end of the small-diameter portion 70a, and a flange 70c connected to a proximal part of the shaft 70b. The tool body 40 has a through hole 86 formed at a position facing the groove 72 in its large-diameter portion 40aL along the axis line a. The shaft 70b of the pushrod 70 is inserted in the through hole 86 in such a manner that the pushrod 70 can move forward and backward, whereby a large part of the pushrod 70 except its distal end is inserted into a pushrod chamber 88 formed inside the tool body 40 (first member 40a and second member 40b).

The inner diameter of the through hole 86 is slightly larger than the outer diameter of the shaft 70b of the pushrod 70 and smaller than the inner diameter of the pushrod chamber 88. Accordingly, a step surface 90 is formed between the pushrod chamber 88 and the through hole 86.

The flange 70c of the pushrod 70 has a diameter that is slightly smaller than the inner diameter of the pushrod chamber 88, so that the flange 70c can slide in the pushrod chamber 88. The cam urging member 52, e.g., made of an elastic body such as a spring etc., is provided between the flange 70c and the step surface 90. The cam urging member 52 elastically urges the flange 70c and the step surface 90 in such a direction as to separate the flange 70c and the step surface 90 away from each other, in other words, to move the cartridge 48 backward.

The tool body 40 (second member 40b and third member 40c) includes a cam chamber 92 that communicates with the proximal end of the pushrod chamber 88, a rod chamber 94 that communicates with a part of the cam chamber 92 that lies closer to the axis line a (closer to the center in the radial direction of the tool body 40), a cylinder chamber 98 that communicates with the rod chamber 94 on the proximal side from the cam chamber 92 (on the arrow Y2 side), and an accommodation chamber 100 that connects with the proximal end of the cylinder chamber 98.

The cam chamber 92 contains the cam 50 that is in contact with a proximal end surface 70d of the pushrod 70. The rod chamber 94 contains a rod 54 that can move forward and backward along the axis line a. The cylinder chamber 98 contains a piston 54a connected to the rod 54 in such a manner that the piston 54a can move forward and backward along the axis line a. The accommodation chamber 100 contains the piston urging member 56 made of an elastic body such as a spring or the like, for elastically urging the piston 54*a* toward the distal end of the cylinder chamber 98.

The cam 50 is in contact with the proximal end surface 70*d* of the pushrod 70 to move the cartridge 48 forward and backward. Specifically, the cam 50 is formed into a substantially circular shape, but has a cut surface 50*a* that is formed by cutting off a segment of its circular arc, a concave portion 50*b* that is concaved toward the center of the circle, and a circular arc surface 50*c* located between the cut surface 50*a* and the concave portion 50*b*. The concave portion 50*b* allows a swelled portion 54*b*, which swells, in the form of a ring, from the outer periphery of the distal end of the rod 54, to enter therein.

The cam 50 is driven to rotate around the center of the circle (circular arc) as the center of rotation, by moving the rod 54 forward and backward while causing the swelled portion 54*b* to enter the concave portion 50*b*. Specifically, the rotation axis of the cam 50 that passes through the above-mentioned center of rotation intersects the axis line a, or is preferably orthogonal thereto. As shown in FIG. 2, by moving the rod 54 forward with the swelled portion 54*b* in contact with the inner surface of the concave portion 50*b*, the cam 50 is rotated such that its circular arc surface 50*c* comes in contact with the proximal end surface 70*d* of the cartridge 48 (pushrod 70).

On the other hand, as shown in FIG. 3, by moving the rod 54 backward with the swelled portion 54*b* in contact with the inner surface of the concave portion 50*b*, the cam 50 is rotated such that its cut surface 50*a* comes in contact with the proximal end surface 70*d* of the cartridge 48. It is thus possible to selectively bring the circular arc surface 50*c* and the cut surface 50*a* into contact with the proximal end surface 70*d* of the cartridge 48.

Figure 4A:
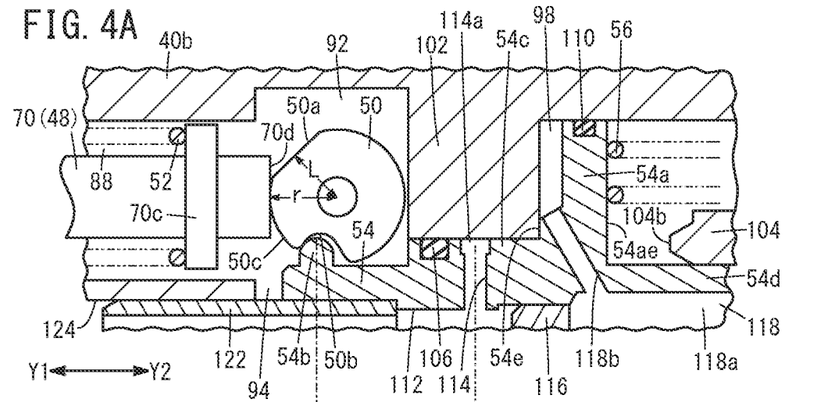
FIGS. 4A, 4B and 4C are explanatory diagrams that are used to explain the relationship between a distance La that the rod retreats from the advanced position to a position at which a cut surface of a cam comes in contact with a cartridge and a distance Lb that the rod retreats from the advanced position to a communicating position.
Figure 4B:
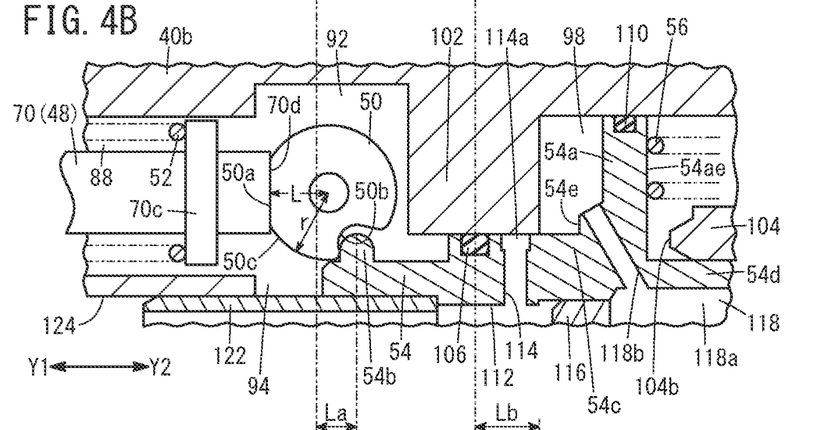
Figure 4C:
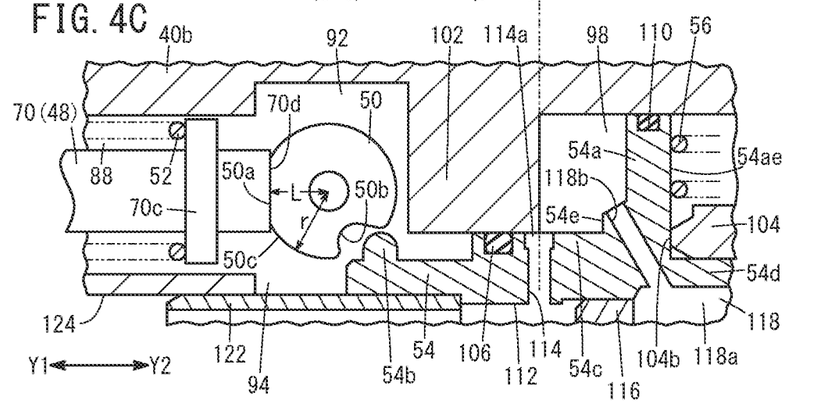
Figure 5:
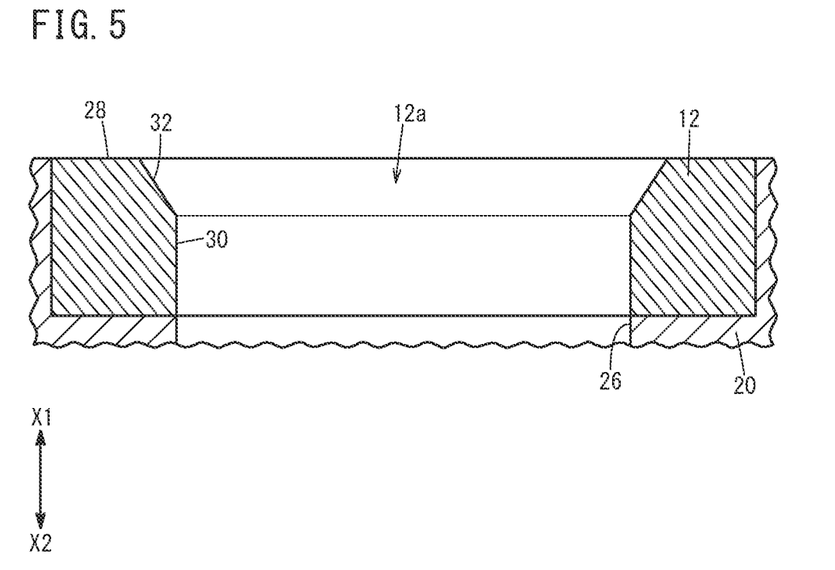
FIG. 5 is a schematic partial cross section of a valve seat material and a cylinder head body before being machined.

As shown in FIGS. 4A to 4C, a radius r of the circular arc surface 50*c* is longer than a length L of the perpendicular line from the circle's center to the cut surface 50*a*. Accordingly, as shown in FIG. 4A, by the circular arc surface 50*c* coming in contact with the proximal end surface 70*d*, the cartridge 48 can be moved forward, against the elastic force of the cam urging member 52, by a distance corresponding to the difference between the radius r and the perpendicular-line's length L, from the position where the cut surface 50*a* is in contact with the proximal end surface 70*d*. In this way, when the cartridge 48 is in the advanced position, as shown in FIG. 2, the cutting edge 46*a* of the third cutting tool 46 is positioned closer to the distal end than the cutting edges 42*a* and 44*a* of the first cutting tool 42 and the second cutting tool 44, for example. It is thus possible to bring only the third cutting tool 46 in contact with the inner periphery of the valve seat material 12 to perform cutting operation.

On the other hand, as shown in FIGS. 4B and 4C, by the cut surface 50*a* coming into contact with the proximal end surface 70*d*, the cartridge 48 can be moved backward under the elastic urging action of the cam urging member 52, by the distance corresponding to the difference between the radius r and the perpendicular-line's length L, from the position where the circular arc surface 50*c* is in contact with the proximal end surface 70*d*. In this way, when the cartridge 48 is in the retreated position, as shown in FIG. 3, the cutting edges 42*a*, 44*a* of the first cutting tool 42 and the second cutting tool 44 are positioned closer to the distal end than the cutting edge 46*a* of the third cutting tool 46, for example. It is thus possible to bring only the first cutting tool 42 and second cutting tool 44 in contact with the inner periphery of the valve seat material 12 to perform cutting operation.

As shown in FIGS. 2 and 3, the second member 40*b* of the tool body 40 includes a first partition 102 disposed between the cam chamber 92 and the cylinder chamber 98 so as to extend radially. The rod 54 has a first sliding portion 54*c* on a middle area in the direction in which the rod 54 extends, and the outer peripheral surface of the first sliding portion 54*c* can slide on the inner peripheral surface 102*a* of the first partition 102 that faces the rod chamber 94. The third member 40*c* of the tool body 40 includes a second partition 104 that extends along the axis line a between the proximal end of the rod chamber 94 (the arrow Y2 side) and the accommodation chamber 100. The rod 54 has a second sliding portion 54*d* at the proximal end thereof, and the outer peripheral surface of the second sliding portion 54*d* can slide on the inner peripheral surface 104*a* of the second partition 104 that faces the rod chamber 94.

That is, the rod 54 can be moved forward and backward between its advanced position at the distal end of its moving direction as shown in FIGS. 2 and 4A and its retreated position at the proximal end of its moving direction as shown in FIGS. 3 and 4C, with the outer peripheral surfaces of its first sliding portion 54*c* and second sliding portion 54*d* sliding respectively along the inner peripheral surfaces 102*a* and 104*a* of the first partition 102 and the second partition 104.

Specifically, the rod 54 has the first sliding portion 54*c* formed in a position spaced backward by a given distance from the swelled portion 54*b* disposed at the distal end of the rod, a stopper portion 54*e* having a larger diameter than the first sliding portion 54*c* and positioned at the proximal end of the first sliding portion 54*c*, a piston 54*a* having a larger diameter than the stopper portion 54*e* and positioned at the proximal end of the stopper portion 54*e*, and the second sliding portion 54*d* having a smaller diameter than the first sliding portion 54*c* and positioned at the proximal end of the piston 54*a*.

A seal member 106 is fitted in a ring-shaped seal groove formed in the outer peripheral surface of the distal portion of the first sliding portion 54*c*, in order to seal the clearance between the inner peripheral surface 102*a* of the first partition 102 and the outer peripheral surface of the first sliding portion 54*c*. A seal member 108 is fitted in a ring-shaped seal groove formed in the outer peripheral surface of the proximal portion of the second sliding portion 54*d*, in order to seal the clearance between the inner peripheral surface 104*a* of the second partition 104 and the outer peripheral surface of the second sliding portion 54*d*. A seal member 110 is fitted in a ring-shaped seal groove formed in the outer peripheral surface of the piston 54*a*, in order to seal the clearance between the distal and proximal spaces in the cylinder chamber 98 that are partitioned by the piston 54*a*.

The interior of the rod 54 includes a distal passage 112, a plurality of connection passages 114, a blocking portion 116, and a supply passage 118. The distal passage 112 extends along the axis line a in a position forward of the blocking portion 116 of the rod 54. Each connection passage 114 is disposed between the distal passage 112 and the outer peripheral surface of the first sliding portion 54*c* so as to extend along the radial direction of the rod 54. That is, each connection passage 114 has an opening 114*a* at one end of the direction in which it extends (on the outer side of the radial direction of the rod 54), and the opening 114*a* is located at the outer peripheral surface of the first sliding portion 54*c*. The blocking portion 116 is interposed between the distal passage 112 and the supply passage 118 to prevent them from communicating with each other.

The supply passage 118 is supplied with a coolant (fluid) from a coolant supply mechanism of the machine tool not shown, through a first tubular member 120 provided at the proximal end of the rod chamber 94. The supply passage 118 has an upstream path 118*a* extending along the axis line a and a plurality of branch paths 118*b* branching off from the upstream path 118*a* to extend to the outer peripheral surface of the stopper portion 54*e*. That is, the downstream end of each branch path 118*b* opens at the outer peripheral surface of the stopper portion 54*e*.

As shown in FIGS. 2 and 4A, when the rod 54 is in the advanced position, the front end surface of the stopper portion 54*e* is in contact with the distal-end-side inner wall surface of the cylinder chamber 98. Accordingly, the outer peripheral surface of the stopper portion 54*e* faces the cylinder chamber 98 irrespective of the position of the rod 54 in its moving direction. That is, irrespective of the position of the rod 54 in its moving direction, the supply passage 118 communicates, through the branch paths 118*b*, with a space in the cylinder chamber 98 on the side forward of the piston 54*a*.

As shown in FIGS. 2 and 3, the piston urging member 56 is provided between the proximal end surface 54*ae* of the piston 54*a* and the proximal-end-side inner wall surface 100*a* of the accommodation chamber 100. Accordingly, as shown in FIGS. 2 and 4A, before the coolant is supplied into the cylinder chamber 98, the rod 54 is in its advanced position under the elastic urging action of the piston urging member 56. Further, as shown in FIG. 4B, when the coolant is supplied into the cylinder chamber 98 through the supply passage 118, the pressure of the coolant in the cylinder chamber 98 increases, and as a result, the rod 54 is moved backward against the elastic force of the piston urging member 56. Further, as shown in FIGS. 3 and 4C, when the rod 54 moves further backward and the proximal end surface 54*ae* of the piston 54*a* comes in contact with the distal end surface 104*b* of the second partition 104, then the rod 54 reaches its retreated position.

As shown in FIG. 4A, when the rod 54 is in the advanced position, the openings 114*a* of the connection passages 114 face the inner peripheral surface 102*a* of the first partition 102, and so the connection passages 114 and the cylinder chamber 98 do not communicate with each other, that is, the communication therebetween are shut off. As shown in FIG. 4B, when the rod 54 moves backward from the advanced position and the cut surface 50*a* of the cam 50 comes in contact with the cartridge 48, then the cartridge 48 moves backward. At this time also, the openings 114*a* of the connection passages 114 face the inner peripheral surface 102*a* of the first partition 102, so that the connection passages 114 and the cylinder chamber 98 are shut off from each other.

As shown in FIG. 4C, when the rod 54 further moves backward and the openings 114*a* of the connection passages 114 face the cylinder chamber 98, then the connection passages 114 and the cylinder chamber 98 communicate with each other. This position of the rod 54 at which the connection passages 114 and the cylinder chamber 98 start communicating with each other is referred to as a communicating position. In this embodiment, the communicating position and the retreated position of the rod 54 are the same position, but the communicating position may be located forward of the retreated position.

As shown in FIGS. 4A to 4C, the distance La that the rod 54 moves backward from the advanced position to a position at which the cut surface 50*a* of the cam 50 comes in contact with the cartridge 48 is shorter than the distance Lb that the rod 54 moves backward from the advanced position to the communicating position.

As shown in FIGS. 3 and 4C, when the fluid is supplied into the cylinder chamber 98 through the supply passage 118 and the rod 54 moves backward to the communicating position, then the cylinder chamber 98 and the connection passages 114 are caused to communicate with each other, and as a result, the coolant in the cylinder chamber 98 is supplied into the distal passage 112 through the connection passages 114.

As shown in FIG. 3, the proximal end of a second tubular member 122 is fitted into the distal end of the distal passage 112. The distal end of the second tubular member 122 is slidably inserted into the proximal end of a coolant passage 124 formed in the first member 40*a* of the tool body 40. Consequently, the distal passage 112 communicates with the coolant passage 124 through the interior of the second tubular member 122.

The proximal end of the reamer 58 is fitted into the distal end of a hole 126 that forms the coolant passage 124 in the first member 40*a*. The reamer 58 is thus fixed to the tool body 40 so as to protrude from the tip of the first member 40*a*. Further, the distal portion of the coolant passage 124 extends between the inner peripheral surface of the hole 126 and the outer peripheral surface of the reamer 58 to open at the distal end surface of the first member 40*a*, and it also branches off to open in the vicinity of the first cutting tool 42, the second cutting tool 44, and the third cutting tool 46 on the outer peripheral surface of the first member 40*a*. Accordingly, the coolant supplied into the coolant passage 124 can be supplied to the machined point during cutting operation using the machining tool 10.

In the machining tool 10, it is possible to control the forward and backward movement of the cartridge 48 in a favorable manner by setting the relationship among the flow passage resistance during the outflow of the coolant to the outside of the tool body 40 through the distal passage 112, the interior of the second tubular member 122, and the coolant passage 124, the elastic urging force of the piston urging member 56, and the pressure in the cylinder chamber 98.

The fluid sensor 59 detects at least one of the flow rate and the pressure of the coolant supplied from the coolant supply mechanism into the cylinder chamber 98. When the flow rate or the pressure of the fluid detected by the fluid sensor 59 is equal to or greater than a given value, it is possible to determine that the rod 54 has retreated to the position at which the cut surface 50*a* of the cam 50 comes in contact with the cartridge 48, in other words, that the cartridge 48 has retreated.

Now, principal operations of the machining tool 10 will be described. When used, the machining tool 10 can be attached to a common machine tool (not shown) having the rotational driving mechanism for rotationally driving the tool body 40, the tool body driving mechanism for moving the tool body 40 forward and backward, and the coolant supply mechanism, for example.

First, the coolant supply mechanism supplies coolant into the supply passage 118 through the first tubular member 120, and then the pressure of the coolant in the cylinder chamber 98 increases. Then, as shown in FIG. 4B, the rod 54 moves backward by the distance La from the advanced position, which causes the cut surface 50*a* of the cam 50 to come in contact with the cartridge 48, causing the cartridge 48 to move backward. As a result, the cutting edges 42*a*, 44*a* of the first cutting tool 42 and the second cutting tool 44, which are directly attached to the tool body 40, are positioned forward of the cutting edge 46a of the third cutting tool 46 that is attached to the cartridge 48.

Then, as shown in FIGS. 3 and 4C, the pressure of the coolant in the cylinder chamber 98 further increases, and the rod 54 moves the distance Lb, larger than the distance La, backward from the advanced position to reach the retreated position (communicating position). This allows the cylinder chamber 98 and the connection passages 114 to communicate with each other, and so the coolant fed into the cylinder chamber 98 is supplied into the distal passage 112 through the connection passages 114. The coolant supplied into the distal passage 112 flows in the interior of the second tubular member 122 and the coolant passage 124 and flows out in the vicinity of the reamer 58, first cutting tool 42, second cutting tool 44, and third cutting tool 46.

In this condition, while the rotational driving mechanism rotates the tool body 40, the tool body driving mechanism moves the tool body 40 to insert the tip of the tool body 40 into the opening 12a of the valve seat material 12, from one end side of the axial direction toward the other end side thereof. Then, first, the reamer 58 attached at the tip of the tool body 40 reams the valve guide hole. During this operation, the coolant is supplied to the machined point or its vicinity through the interior of the tool body 40.

Figure 6:
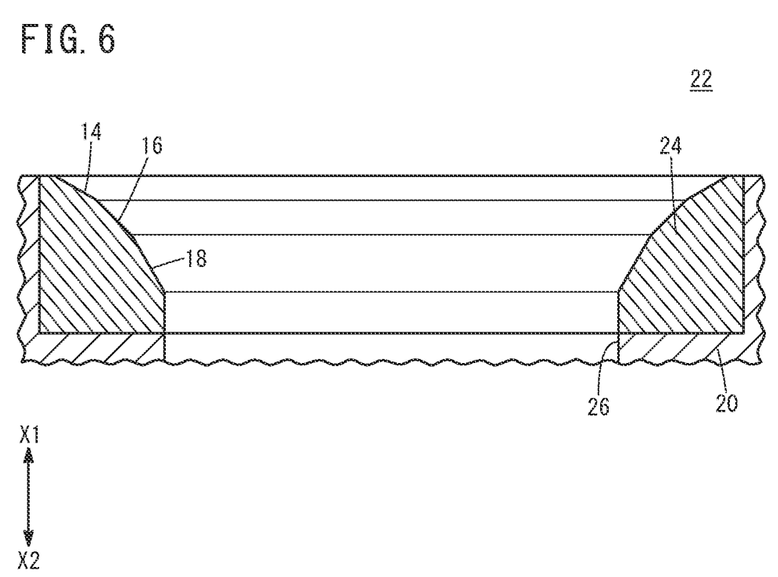
FIG. 6 is a schematic partial cross section of the cylinder head after the valve seat material of FIG. 5 has been machined.
Figure 7:
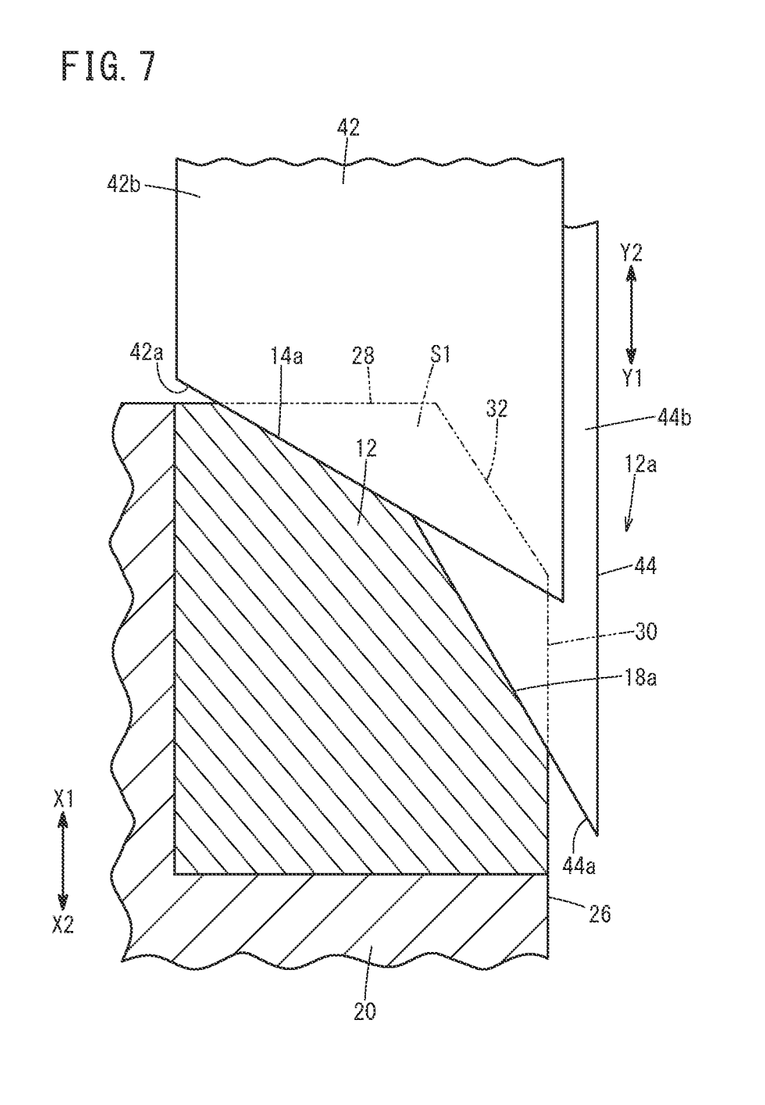
FIG. 7 is a schematic explanatory diagram used to explain how relief surfaces are formed on the valve seat material of FIG. 5 by using a first cutting tool and a second cutting tool.

Next, as shown in FIG. 7, the cutting edges 42a and 44a of the first cutting tool 42 and the second cutting tool 44 are placed in contact with the valve seat material 12 to perform the cutting operation to form the first relief surface 14 and the second relief surface 18 shown in FIG. 6. During this operation, too, the coolant is supplied to the machined point or its vicinity through the interior of the tool body 40. In this cutting operation, the first cutting tool 42 and the second cutting tool 44 remove a portion of the valve seat material 12 from the orthogonal end surface 28 and the tapered surface 32.

This cutting operation is continued until the portion of the valve seat material 12 corresponding to the machining allowance S1 shown by two-dot chain line in FIG. 7 has been removed, and then the tool body driving mechanism slightly moves the tool body 40 backward toward the one end side of the axial direction (in the arrow X1 direction), to thereby separate the valve seat material 12 and the first and second cutting tools 42 and 44 away from each other. This cutting operation forms, on the valve seat material 12, a first machined surface 14a having the same angle of inclination as the first relief surface 14 and a second machined surface 18a having the same angle of inclination as the second relief surface 18.

Next, the supply of coolant into the supply passage 118 by the coolant supply mechanism is stopped, which lowers the coolant pressure in the cylinder chamber 98 and causes the rod 54 to move forward to the advanced position. This causes the circular arc surface 50c of the cam 50 to come in contact with the proximal end surface 70d of the cartridge 48, causing the cartridge 48 to move forward. Then, the cutting edge 46a of the third cutting tool 46 attached to the cartridge 48 is brought forward past the cutting edges 42a and 44a of the first and second cutting tools 42 and 44 that are directly attached to the tool body 40.

Figure 8:
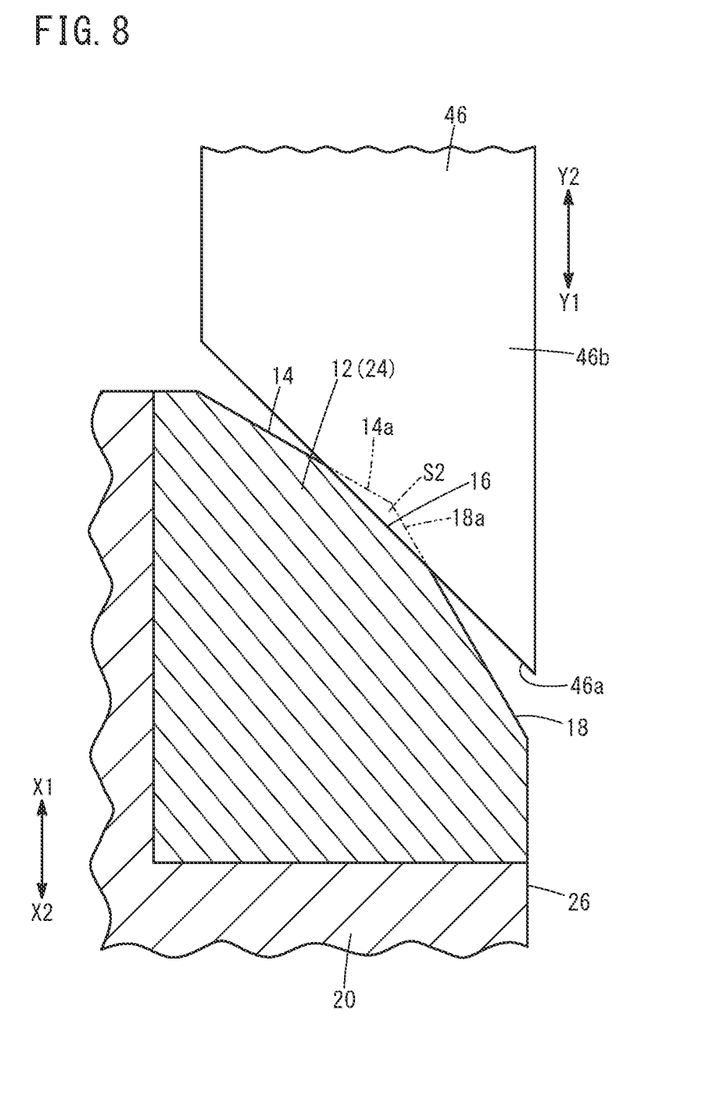
FIG. 8 is a schematic explanatory diagram used to explain how a valve seat surface is formed on the valve seat material of FIG. 7 by using a third cutting tool.

In this condition, while the rotational driving mechanism rotationally drives the tool body 40, the tool body driving mechanism moves the tool body 40 forward in the direction toward the other end side of the axial direction (in the arrow X2 direction). Then, as shown in FIG. 8, the cutting edge 46a of the third cutting tool 46 is brought into contact with the valve seat material 12 from which the machining allowance S1 has been removed, and the cutting edge 46a performs a cutting operation for forming the valve seat surface 16 between the first machined surface 14a and the second machined surface 18a. If the supply of coolant to the machined point through the interior of the tool body 40 is stopped during the cutting operation, coolant may be supplied to the machined point from outside of the tool body 40.

As described above, the cutting operation is performed until the part of the valve seat material 12 corresponding to the machining allowance S2 shown by two-dot chain line in FIG. 8 has been removed, and the tool body driving mechanism moves the tool body 40 backward in the direction toward the one end side of the axial direction, whereby the valve seat 24 has been obtained which has the first relief surface 14, valve seat surface 16, and second relief surface 18 formed on the inner periphery of its opening in this order from the one end side of the axial direction.

As has been discussed above, in the machining tool 10 of the embodiment, the third cutting tool 46 attached to the cartridge 48 can be moved forward and backward along the axis line a. This enables the third cutting tool 46 to come in contact with the valve seat material 12 (machined portion) with different timing from the first cutting tool 42 and the second cutting tool 44 that are directly attached to the tool body 40, whereby the first relief surface 14, the valve seat surface 16, and the second relief surface 18 (hereinafter, collectively referred to also as a plurality of machined surfaces) can be machined with different timings.

Consequently, the valve seat surface 16 that requires being formed more accurately than the other machined surfaces, for example, can be machined after the other machined surfaces, i.e., the first relief surface 14 and second relief surface 18 have been machined. It is then possible to reduce the machining allowance S2 for the machining of the valve seat surface 16, and so it is possible to effectively reduce the wear of the third cutting tool 46 used to machine the valve seat surface 16. As a result, the valve seat surface 16 can be machined highly accurately without the need to increase the frequencies of sharpening and replacement of the third cutting tool 46.

Furthermore, the cutting operations for machining the plurality of machined surfaces with different timings require simply moving the cartridge 48 forward and backward, without the need for tool replacement using a tool changer or the like, which also enables efficient cutting operations.

Thus, the machining tool 10 makes it possible to easily perform highly accurate and efficient cutting operations.

Moreover, with the machining tool 10, the cartridge 48 can move forward and backward along the axis line a, and therefore the external dimension in the direction orthogonal to the axis line a can be reduced, as compared to configurations where the cartridge 48 is moved forward and backward in a direction inclined with respect to the axis line a, for example. Accordingly, for example, it is easy to configure a multi-axis arrangement in which multiple machining tools 10 are arranged side by side, in order to perform cutting operation on the inner peripheries of a plurality of openings at one time.

The machining tool 10 of the embodiment above further includes the cam urging member 52 for elastically urging the cartridge 48 in the retreating direction, and the cam 50 has the circular arc surface 50c extending along the outer circumference of a circular arc and the cut surface 50a that is formed by cutting off a segment of the circular arc. The cam 50 can rotate around the center of the circular arc as the center of rotation in such a manner that the circular arc surface 50c and the cut surface 50a are selectively brought into contact with the proximal end surface 70*d* of the cartridge 48. The cartridge 48 is advanced against the elastic force of the cam urging member 52 when the circular arc surface 50*c* comes in contact with the proximal end surface 70*d*, and the cartridge 48 is retreated under the elastic urging action of the cam urging member 52 when the cut surface 50*a* comes in contact with the proximal end surface 70*d*.

In this case, as described earlier, the cartridge 48 can be moved forward and backward by a distance corresponding to the difference between the radius r of the circular arc surface 50*c* and the length L of the perpendicular line from the center of the circular arc to the cut surface 50*a*. That is, the cartridge 48 can be moved more forward by the above difference when the circular arc surface 50*c* extending along the outer circumference of the circular arc is in contact with the proximal end surface 70*d* of the cartridge 48, than when the cut surface 50*a* is in contact with the proximal end surface 70*d*.

The cam 50 rotates around the center of the circular arc and therefore the amount of advancement of the cartridge 48 remains constant whichever portion of the circular arc surface 50*c* the proximal end surface 70*d* contacts. It is thus possible to easily keep high positioning accuracy of the cutting tool through the cartridge 48, without the need to precisely adjust the amount of rotation of the cam 50. Further, the cutting operation by the cutting tool attached to the cartridge 48 is performed with the circular arc surface 50*c*, extending along the circular arc, being in contact with the proximal end surface 70*d* of the cartridge 48, which enhances the durability of the machining tool 10 against the machining reaction force. Furthermore, the cut surface 50*a* placed in contact with the proximal end surface 70*d* enables the cartridge 48 to be kept in the retreated position reliably.

The machining tool 10 of the embodiment above further includes: the rod 54 that rotates the cam 50 by advancing and retreating in the interior of the tool body 40 along the axis line a; and the cylinder chamber 98 that is formed in the interior of the tool body 40 and configured to be supplied with a fluid. The rod 54 includes the piston 54*a* that is movable along the axis line a in the cylinder chamber 98, and the rod 54 advances and retreats as the piston 54*a* is displaced by the pressure of the fluid in the cylinder chamber 98.

The third cutting tool 46 attached to the cartridge 48 can be moved forward and backward by the rod 54 that is moved forward and backward by the pressure of the coolant in the cylinder chamber 98. That is, the cartridge 48 can be moved forward and backward by supplying the fluid (coolant) into the cylinder chamber 98 by using a fluid supply mechanism provided in a common machine tool. Accordingly, the machining tool 10 is applicable to various machine tools having such a fluid supply mechanism, without being limited to use with a machine tool having a dedicated driving mechanism including a motor, feed screw, etc. for driving the cartridge 48. The machining tool 10 thus offers superior versatility. In this case, the direction in which the cartridge 48 is moved forward and backward is not limited to the direction along the axis line a. The cartridge 48 may be moved forward and backward along the radial direction of the tool body 40, for example.

In the machining tool 10 of the embodiment above, the rod 54 advances and retreats between an advanced position at the distal end of its moving direction and a retreated position at the proximal end of the moving direction. The piston 54*a* is elastically urged by the piston urging member 56 toward the distal end of the cylinder chamber 98, and the cylinder chamber 98 communicates with the supply passage 118 formed in the rod 54. The rod 54 is in the advanced position under the elastic urging action of the piston urging member 56, before the fluid (coolant) is supplied into the cylinder chamber 98, and the rod 54 retreats against the elastic force of the piston urging member 56, when the fluid is supplied into the cylinder chamber 98 through the supply passage 118 and the pressure of the fluid in the cylinder chamber 98 increases.

Thus, when the first cutting tool 42 and the second cutting tool 44 attached to the tool body 40 are to be placed in contact with the machined portion and used for cutting operation, for example, the third cutting tool 46 attached to the cartridge 48 can be withdrawn from the machined portion by withdrawing the cartridge 48 by supplying the coolant into the cylinder chamber 98 through the supply passage 118.

On the other hand, when the third cutting tool 46 is to be placed in contact with the machined surface and used for cutting operation, the cartridge 48 can be moved forward by stopping the supply of coolant through the supply passage 118. The cutting operation can then be performed with the third cutting tool 46 being in contact with the machined portion, in place of the first cutting tool 42 and the second cutting tool 44. This makes it easy to machine a plurality of machined surfaces with different timings.

In the machining tool 10 of the embodiment above, the rod 54 includes: the connection passages 114 that communicate with the cylinder chamber 98 when the rod 54 retreats from the advanced position to the communicating position and that shut off communication with the cylinder chamber 98 when the rod 54 is placed forward of the communicating position; and the distal passage 112 that communicates with the connection passages 114 and extends forward from the connection passages 114. The coolant is supplied into the distal passage 112, when the fluid is supplied into the cylinder chamber 98 through the supply passage 118 and the rod 54 retreats to the communicating position to establish communication between the cylinder chamber 98 and the connection passages 114.

Thus, the coolant can be supplied into the distal passage 112 through the connection passages 114, when the coolant is supplied into the cylinder chamber 98 through the supply passage 118 and the rod 54 is moved backward to the communicating position. That is, when the cartridge 48 is withdrawn, the coolant can be supplied to the machined point or the like that is outside of the tool body 40 through the coolant passage 124.

In the machining tool 10 of the embodiment above, the rod 54 has the connection passages 114 that are situated forward of the piston 54*a*, and the swelled portion 54*b* that is situated forward of the connection passages 114 and that swells from the outer peripheral surface of the rod 54, and the cam 50 has the concave portion 50*b* into which the swelled portion 54*b* can enter. The cam 50 is rotated so that the circular arc surface 50*c* comes in contact with the proximal end surface 70*d* of the cartridge 48, when the rod 54 is advanced to the advanced position with the swelled portion 54*b* being in contact with the inner surface of the concave portion 50*b*. The cam 50 is rotated so that the cut surface 50*a* comes in contact with the proximal end surface 70*d* of the cartridge 48, when the rod 54 is retreated to the retreated position with the swelled portion 54*b* being in contact with the inner surface of the concave portion 50*b*.

In this case, as stated above, the amount of advancement of the cartridge 48 remains constant whichever portion of the circular arc surface 50*c* the proximal end surface 70*d* of the cartridge 48 contacts. It is thus easy to keep the third cutting tool 46 positioned highly accurately through the cartridge 48, with a simple configuration, and without the need to precisely adjust the amount of advancement of the rod 54.

In the machining tool 10 of the embodiment above, the distance La that the rod 54 retreats from the advanced position to a position at which the cut surface 50a of the cam 50 comes in contact with the proximal end surface 70d of the cartridge 48 is shorter than the distance Lb that the rod 54 retreats from the advanced position to the communicating position. If the coolant passage upstream of the cylinder chamber 98 is clogged by sludge etc. produced by the cutting operation, then the flow rate (the amount of supply) of the coolant into the cylinder chamber 98 may decrease.

In this case, if the amount of supply of the coolant decreases when the rod 54 is in the advanced position as shown in FIG. 4A, for example, then the pressure in the cylinder chamber 98 cannot increase smoothly and then the cartridge 48 may not be moved backward smoothly. Even in such a case, the cylinder chamber 98 and the connection passages 114 do not communicate with each other until the rod 54 retreats and causes the cut surface 50a of the cam 50 to come in contact with the proximal end surface 70d of the cartridge 48 (until the cartridge 48 retreats). This avoids the situation where the coolant in the cylinder chamber 98 flows out through the connection passages 114, which allows the pressure in the cylinder chamber 98 to increase smoothly. As a result, the cartridge 48 can be moved backward easily.

Further, the distance La that the rod 54 retreats from the advanced position to the position at which the cut surface 50a comes in contact with the proximal end surface 70d of the cartridge 48 is set shorter than the distance Lb that the rod 54 retreats from the advanced position to the retreated position. This also allows the cartridge 48 to retreat easily.

Further, if the amount of supply of the coolant decreases when the rod 54 is in the retreated position as shown in FIG. 4C, for example, then the pressure in the cylinder chamber 98 is likely to decrease and then it may be difficult to keep the cartridge 48 in the retreated position. Even in this case, the communication between the cylinder chamber 98 and the connection passages 114 is shut off as shown in FIG. 4B before the rod 54 advances to the position where the circular arc surface 50c of the cam 50 comes in contact with the proximal end surface 70d of the cartridge 48 (the position where the cartridge 48 is advanced). This avoids the situation where the coolant in the cylinder chamber 98 flows out through the connection passages 114, which reduces the pressure decrease in the cylinder chamber 98. As a result, it is possible to keep the cartridge 48 in the retreated position reliably.

In the machining tool 10 of the embodiment above, the fluid is a coolant that is supplied to the machined point of the workpiece. In general, the machine tool to which the machining tool 10 for cutting operation is attached has a coolant supply mechanism for supplying coolant to the machined point. Accordingly, the configuration that moves the cartridge 48 forward and backward by the supply and discharge of the coolant can be applied to more varieties of machine tools and further enhances the versatility of the machining tool 10. The fluid supplied into the cylinder chamber 98 is not limited to coolants. Fluids other than coolants, such as air etc., can be supplied into the cylinder chamber 98.

The machining tool 10 of the embodiment above further includes the fluid sensor 59 for detecting at least one of the flow rate and pressure of the fluid supplied into the cylinder chamber 98. In this case, when the flow rate or pressure of the fluid detected by the fluid sensor 59 is above a given value, it is possible to determine that the rod 54 has retreated to the position where the cut surface 50a of the cam 50 comes in contact with the cartridge 48, in other words, that the cartridge 48 has retreated. In this way, by monitoring the result detected by the fluid sensor 59, it is possible to more reliably adjust the position of the third cutting tool 46 relative to the tool body 40 (first cutting tool 42 and second cutting tool 44) so as to perform cutting operation accurately.

In the machining tool 10 of the embodiment above, the cartridge 48 is slidably mounted in the groove 72 formed in the tool body 40 along the axis line a, and the groove 72 has the first inner wall surface 72a that is in contact with the end surface 78 of the cartridge 48 that is situated in the backward position in the direction in which the cartridge 48 rotates together with the tool body 40, and the second inner wall surface 72b that is in contact with the end surface 80 of the cartridge 48 that is situated closer to the axis line a. The tool body 40 is provided with the flat spring 82 (pressing member) for pressing the cartridge 48 from forward in the direction in which the cartridge 48 rotates, along a direction that is inclined with respect to both of the first inner wall surface 72a and the second inner wall surface 72b.

During cutting operation using the third cutting tool 46 attached to the cartridge 48, the cartridge 48 is subjected to cutting resistance from front to back in the direction of rotation. Accordingly, by situating the cartridge 48 in contact with the first inner wall surface 72a and the second inner wall surface 72b, the cutting operation can be performed with the cartridge 48 being stably fixed to the tool body 40, which enhances the machining accuracy. Further, the flat spring 82 pressing the cartridge 48 in this direction effectively prevents the cartridge 48, which is subjected to the centrifugal force during cutting operation, from separating away from the tool body 40, while allowing the cartridge 48 to move forward and backward along the axis line a, against the elastic force of the flat spring 82. Various pressing members capable of pressing the cartridge 48 in the above-described manner can be adopted in place of the flat spring 82.

In the machining tool 10 of the embodiment above, the plurality of machined surfaces include the valve seat surface 16 of the cylinder head 22, and the first relief surface 14 and second relief surface 18 that are provided on both sides of the valve seat surface 16 in the axial direction. The plurality of cutting tools include the first cutting tool 42 for forming the first relief surface 14, the second cutting tool 44 for forming the second relief surface 18, and the third cutting tool 46 for forming the valve seat surface 16. The first cutting tool 42 and the second cutting tool 44 are directly attached to a distal end portion of the tool body 40, and the third cutting tool 46 is attached to a distal end portion of the cartridge 48.

As stated earlier, the valve seat surface 16 is the surface that the valve contacts, and therefore it requires more precisely adjusted circularity, surface roughness, etc., compared to the first relief surface 14 and second relief surface 18. It is possible to reduce the machining allowance S2 for the machining of the valve seat surface 16 (see FIG. 8) by machining the valve seat surface 16 with the third cutting tool 46 after forming the first relief surface 14 and the second relief surface 18 with the first cutting tool 42 and second cutting tool 44. This reduces the wear of the third cutting tool 46 effectively, which makes it possible to machine the valve seat surface 16 highly accurately, without the need to increase the frequencies of sharpening and replacement of the third cutting tool 46.

On the other hand, the machining allowance S1 for the cutting operation of the first relief surface 14 and second relief surface 18 (see FIG. 7) are larger than that for the valve seat surface 16, and the first cutting tool 42 and second cutting tool 44 used to machine these surfaces are directly attached to the tool body 40. This enables the first cutting tool 42 and second cutting tool 44 to be attached to the tool body 40 more firmly than when they are attached through the cartridge 48, which reduces vibration etc. generated by the machining operation and enhances machining accuracy and durability. As to the valve seat surface 16, because the machining allowance S2 can be reduced as mentioned above, sufficient machining accuracy is obtained even when the third cutting tool 46 for forming the valve seat surface 16 is attached to the cartridge 48.

Further, the machining tool 10 only needs the cartridge 48 for moving the third cutting tool 46 forward and backward, since the first cutting tool 42 and the second cutting tool 44 are attached directly to the tool body 40. It is therefore possible to reduce the number of cartridge(s) 48 attached to the tool body 40 as small as possible to effectively reduce its external dimension in the direction orthogonal to the axis line a.

In the machining tool 10 of the embodiment above, the reamer 58 for machining a valve guide hole is fixed at the tip of the tool body 40. In this case, the reamer 58 can be rotated and moved forward and backward by rotating and moving the tool body 40 using the rotational driving mechanism and tool body driving mechanism. That is, the reamer 58 can perform machining operation without the need for a driving mechanism dedicated to the reamer, which avoids limitation of the kinds of machine tools to which the machining tool 10 can be attached and further enhances the versatility of the machining tool 10.

The present invention is not particularly limited to the embodiments described above, but can be modified in various manners without departing from the essence and gist of the invention.

For example, the third cutting tool 46 may be attached directly to the distal end portion of the tool body 40 of the machining tool 10. In this case, two cartridges 48 may be attached to the machining tool 10, in which case the first cutting tool 42 may be attached to one cartridge 48 and the second cutting tool 44 may be attached to the other cartridge 48. Alternatively, the first cutting tool 42 and the second cutting tool 44 may both be attached to one cartridge 48.

In this case, too, the machining for forming the valve seat surface 16 by the third cutting tool 46 can be performed after the machining for forming the first relief surface 14 and second relief surface 18 by the first cutting tool 42 and second cutting tool 44. This makes it possible to reduce the machining allowance S2 for the machining of the valve seat surface 16 and to form the valve seat surface 16 highly accurately, without the need to increase the frequencies of sharpening and replacement of the third cutting tool 46. In addition, in this case, performing the machining operation for forming the valve seat surface 16 using the third cutting tool 46 that is firmly attached to the tool body 40 enhances the machining accuracy of the valve seat surface 16 further effectively.

The plurality of cutting tools attached to the machining tool 10 are not limited to three cutting tools, i.e., the first cutting tool 42, second cutting tool 44, and third cutting tool 46. The number of cutting tools can be determined according to the number of machined surfaces to be formed on the inner periphery of the opening, which can be two, or four or more.

LIST OF REFERENCE NUMERALS

10: machining tool
12: valve seat material
12a: opening
14: first relief surface
16: valve seat surface
18: second relief surface
22: cylinder head
40: tool body
42: first cutting tool
44: second cutting tool
46: third cutting tool
48: cartridge
50: cam
50a: cut surface
50b: concave portion
50c: circular arc surface
52: cam urging member
54: rod
54a: piston
54b: swelled portion
56: piston urging member
58: reamer
59: fluid sensor
70d: proximal end surface
72: groove
72a: first inner wall surface
72b: second inner wall surface
74a: pressed surface
78, 80: end surface
82: flat spring
98: cylinder chamber
112: distal passage
114: connection passage
118: supply passage

What is claim is:

1. A machining tool for performing cutting operation on an inner periphery of a workpiece including an opening to form a plurality of machined surfaces, the machining tool comprising:
a tool body configured to be driven to rotate around an axis line;
a plurality of cutting tools configured to rotate together with the tool body;
a cartridge configured to be attached to the tool body so as to advance and retreat along the axis line; and
a cam configured to come into contact with a proximal end surface of the cartridge to thereby cause the cartridge to advance and retreat,
at least one of the plurality of cutting tools being attached to the cartridge; wherein
the cam has a circular arc surface extending along an outer circumference of a circular arc and a cut surface formed by cutting off a segment of the circular arc, and the cam is configured to rotate around a center of the circular arc as a center of rotation so that the circular arc surface and the cut surface are selectively brought into contact with the proximal end surface of the cartridge,
the cartridge is advanced when the circular arc surface comes in contact with the proximal end surface, and
the cartridge is retreated when the cut surface comes in contact with the proximal end surface.

2. The machining tool according to claim 1, further comprising a cam urging member configured to elastically urge the cartridge in a retreating direction,
   wherein the cartridge is advanced against elastic force of the cam urging member when the circular arc surface comes in contact with the proximal end surface, and
   the cartridge is retreated under elastic urging action of the cam urging member when the cut surface comes in contact with the proximal end surface.

3. The machining tool according to claim 1, further comprising:
   a rod configured to rotate the cam by advancing and retreating in an interior of the tool body along the axis line; and
   a cylinder chamber formed in the interior of the tool body and configured to be supplied with a fluid,
   wherein the rod includes a piston configured to be movable along the axis line in the cylinder chamber, and
   the rod advances and retreats as the piston is displaced by a pressure of the fluid in the cylinder chamber.

4. The machining tool according to claim 3, wherein
   the rod advances and retreats between an advanced position at a distal end of a moving direction and a retreated position at a proximal end of the moving direction,
   the piston is elastically urged by a piston urging member toward a distal end of the cylinder chamber,
   the cylinder chamber communicates with a supply passage formed in the rod,
   before the fluid is supplied into the cylinder chamber, the rod is in the advanced position under elastic urging action of the piston urging member, and
   when the fluid is supplied into the cylinder chamber through the supply passage to thereby increase the pressure of the fluid in the cylinder chamber, the rod retreats against elastic force of the piston urging member.

5. The machining tool according to claim 4, wherein
   the rod includes:
   a connection passage configured to communicate with the cylinder chamber when the rod retreats from the advanced position to a communicating position and shut off communication with the cylinder chamber when the rod is placed forward of the communicating position; and
   a distal passage that communicates with the connection passage and extends forward from the connection passage, and
   the fluid is supplied into the distal passage, when the fluid is supplied into the cylinder chamber through the supply passage and the rod retreats to the communicating position to establish communication between the cylinder chamber and the connection passage.

6. The machining tool according to claim 5, wherein the rod has the connection passage situated forward of the piston, and a swelled portion that is situated forward of the connection passage and that swells from an outer peripheral surface of the rod, and
   the cam has a concave portion into which the swelled portion enters,
   and wherein, when the rod is advanced to the advanced position with the swelled portion being in contact with an inner surface of the concave portion, the cam is rotated so that the circular arc surface comes in contact with the proximal end surface of the cartridge, and when the rod is retreated to the retreated position with the swelled portion being in contact with the inner surface of the concave portion, the cam is rotated so that the cut surface comes in contact with the proximal end surface of the cartridge.

7. The machining tool according to claim 5, wherein a distance that the rod retreats from the advanced position to a position at which the cut surface of the cam comes in contact with the proximal end surface of the cartridge is shorter than a distance that the rod retreats from the advanced position to the communicating position.

8. The machining tool according to claim 3, wherein the fluid is a coolant that is supplied to a machined point of the workpiece.

9. The machining tool according to claim 3, further comprising a fluid sensor configured to detect at least one of a flow rate and the pressure of the fluid supplied into the cylinder chamber.

10. The machining tool according to claim 1, wherein
    the cartridge is slidably mounted in a groove formed in the tool body along the axis line,
    the groove has a first inner wall surface that is in contact with an end surface of the cartridge that is situated in a backward position in a rotation direction in which the cartridge rotates together with the tool body, and a second inner wall surface that is in contact with an end surface of the cartridge that is situated closer to the axis line, and
    the tool body is provided with a pressing member configured to press the cartridge from forward in the rotation direction of the cartridge, along a direction that is inclined with respect to both of the first inner wall surface and the second inner wall surface.

11. The machining tool according to claim 1, wherein
    the plurality of machined surfaces include a valve seat surface of a cylinder head, and a first relief surface and a second relief surface that are provided respectively on both sides of the valve seat surface in an axial direction,
    the plurality of cutting tools include a first cutting tool configured to form the first relief surface, a second cutting tool configured to form the second relief surface, and a third cutting tool configured to form the valve seat surface,
    wherein the first cutting tool and the second cutting tool are directly attached to a distal end portion of the tool body, and
    the third cutting tool is attached to a distal end portion of the cartridge.

12. The machining tool according to claim 1, wherein
    the plurality of machined surfaces include a valve seat surface of a cylinder head, and a first relief surface and a second relief surface that are provided respectively on both sides of the valve seat surface in an axial direction,
    the plurality of cutting tools include a first cutting tool configured to form the first relief surface, a second cutting tool configured to form the second relief surface, and a third cutting tool configured to form the valve seat surface,
    wherein the first cutting tool and the second cutting tool are attached to a distal end portion of the cartridge, and
    the third cutting tool is directly attached to a distal end portion of the tool body.

13. The machining tool according to claim 1, wherein a reamer for machining a valve guide hole is fixed at a tip of the tool body.

* * * * *